United States Patent [19]

Hsu

[11] Patent Number: 5,568,117
[45] Date of Patent: Oct. 22, 1996

[54] COMBINED ELECTRIC PUMP AND ILLUMINATING/ALARM DEVICE

[76] Inventor: Kun-Shan Hsu, No. 3, Ha Ko Liau, Pei Hou Lei, Chia Yi, Taiwan

[21] Appl. No.: 554,835

[22] Filed: Nov. 7, 1995

[51] Int. Cl.⁶ .................................................. G08B 23/00
[52] U.S. Cl. .................. 340/321; 340/473; 340/442; 417/234; 417/411
[58] Field of Search .................. 340/321, 473, 340/442; 417/233, 234, 411, 417, 423.14, 360

[56] References Cited

U.S. PATENT DOCUMENTS

| | | | |
|---|---|---|---|
| 2,491,094 | 12/1949 | Frane | 340/321 |
| 2,589,747 | 3/1952 | Tedeschi | 340/321 |
| 2,638,584 | 5/1953 | Fortney | 340/321 |
| 2,816,277 | 12/1957 | Salkowski | 340/321 |
| 2,861,174 | 11/1958 | Talbot et al. | 340/321 |
| 2,915,744 | 12/1959 | Lewis | 340/321 |
| 2,980,889 | 4/1961 | Meissner | 340/321 |
| 2,987,718 | 6/1961 | Davis | 340/321 |
| 3,030,497 | 4/1962 | Cheng | 340/321 |
| 3,114,906 | 12/1963 | Shattuck | 340/321 |
| 3,266,014 | 8/1966 | Leotta | 340/321 |
| 3,676,664 | 7/1972 | Corvetti | 340/321 |
| 4,048,631 | 9/1977 | Flores | 340/321 |
| 4,466,780 | 8/1984 | Naurath | 417/360 |
| 4,621,984 | 11/1985 | Fussell | 417/411 |
| 4,776,766 | 10/1988 | Brent | 340/473 |

*Primary Examiner*—Jeffery Hofsass
*Assistant Examiner*—Nina Tong
*Attorney, Agent, or Firm*—Morton J. Rosenberg; David I. Klein

[57] ABSTRACT

A portable electric pump and illuminating/alarm device includes a main body housing, an illumination lamp mounted to the main body housing to illuminate in a front direction, two alarm lamps respectively mounted to two lateral sides of the main body housing to illuminate in a lateral direction, a pressure gauge mounted to the main body housing, an air outlet nozzle, a plug for electrical connection with an external power source, and switches for controlling on and off of the illumination lamp and alarm lamps as well as the air outlet nozzle.

1 Claim, 7 Drawing Sheets

COMBINED ELECTRIC PUMP AND ILLUMINATING/ALARM DEVICE

BACKGROUND OF THE INVENTION

1. Field of the Invention

The present invention relates to an improved combined portable electric pump and illuminating/alarm device for automobiles.

2. Description of Related Art

Automobiles provide convenient tools for modern people in transportation and traffic. Nevertheless, one of the most significant problems for automobiles is having a flat tire, especially on a highway, in wilderness or desolate areas. A portable electric pump and illuminating/alarm device is particularly useful in this case, especially in the night or in other conditions of poor visibility. A typical portable electric pump and illuminating/alarm device, as shown in FIGS. 1 and 2 of the drawings, includes a main body 20, an illuminating lamp 22, an alarm lamp housing 21 removably mounted to the illuminating lamp 22, a tire pressure gauge 23, a switch 24 for the illuminating lamp 22 as well as the alarm lamp housing 21, a handle 25, and an inflation means 26 for inflating a flat tire. The illuminating lamp 22 provides illumination in the night or in other conditions of poor visibility, such as illuminating the inflation valve of the tire in such situations. The alarm lamp housing 21, usually red, is removably mounted to the main body 20 and thus encloses the illuminating lamp 22 to provide an alarm function.

However, the above-mentioned device still has several drawbacks. First of all, when using the device in the night or in other conditions of poor visibility, the user can only at any one time only use one of the illumination and alarm functions, i.e., when the device is used to illuminate the tire (e.g., for pumping), it fails to provide the function of the alarm lamp which may endanger the life of the user, and when the device serves as an alarm lamp, it cannot provide the illumination function to illuminate the tire for inflation or checking purposes. Secondly, the red alarm lamp housing has to be mounted to the device in order to provide the alarm function, which is inconvenient to the user and also affects the illumination function. In addition, the alarm lamp housing only provides one side illumination and the alarm effect is unsatisfactory. Furthermore, the conventional device is bulky and is inconvenient for carriage in addition to occupying a larger space.

Therefore, there has been a long and unfulfilled need for an improved portable electric pump and illuminating/alarm device which mitigates and/or obviates the above-mentioned problems.

SUMMARY OF THE INVENTION

It is an object of the present invention to provide an improved portable electric pump and illuminating/alarm device which includes an illumination lamp to illuminate a front direction of the device and two alarm lamps respectively mounted to two lateral sides thereof to provide illumination and alarm functions simultaneously such that the user need not switch the device between its illumination and alarm modes of operation.

It is another object of the present invention to provide a portable electric pump and illuminating/alarm device which is compact, streamlined and easy to carry.

Other objects, advantages, and novel features of the invention will become more apparent from the following detailed description when taken in conjunction with the accompanying drawings.

DESCRIPTION OF THE PREFERRED EMBODIMENT

Figure 1:
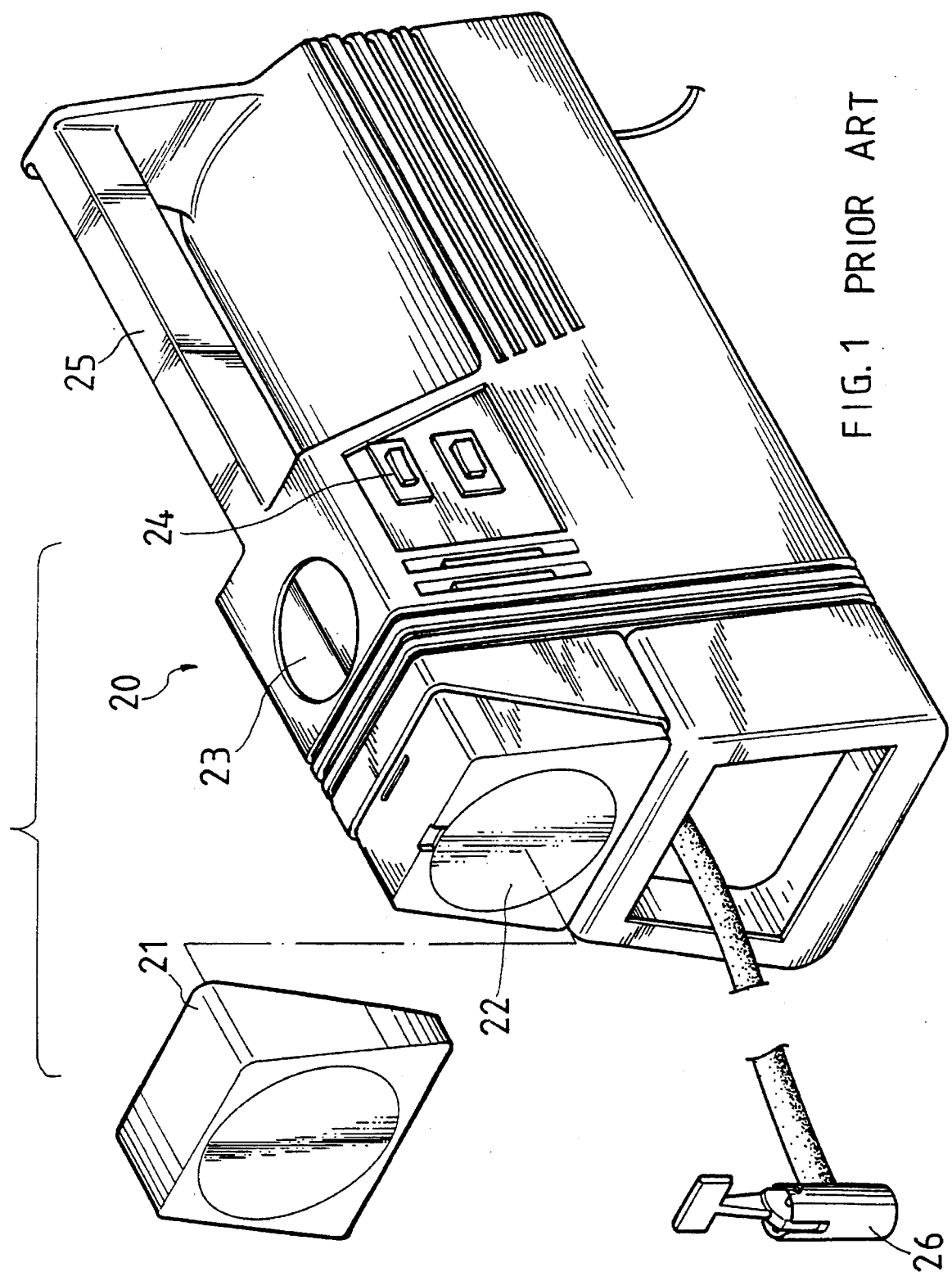
FIG. 1 is a perspective view, partly exploded, of a portable electric pump and illuminating/alarm device according to prior art.
Figure 2:
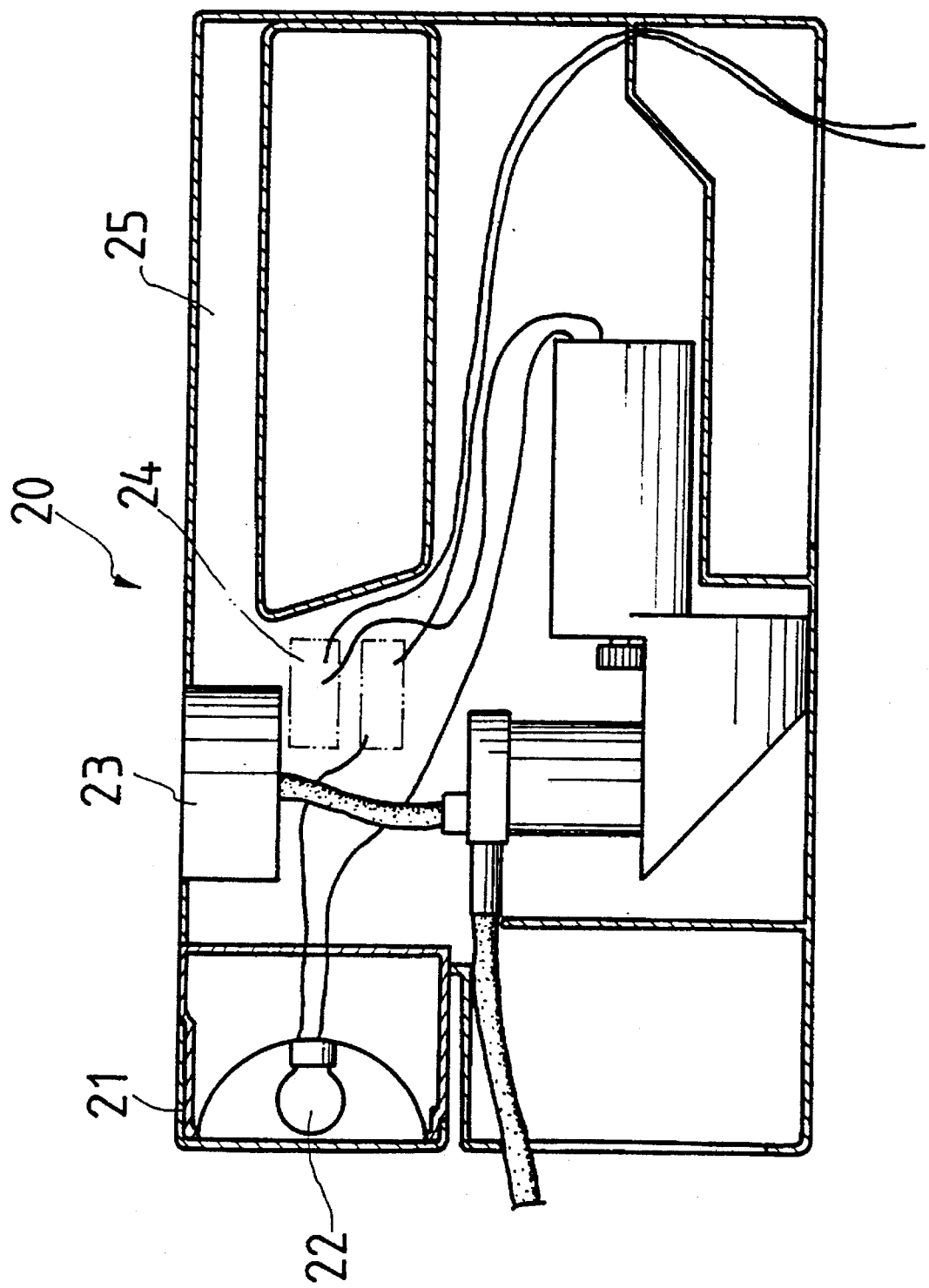
FIG. 2 is a schematic longitudinal cross-sectional view of the device in FIG. 1.
Figure 3:
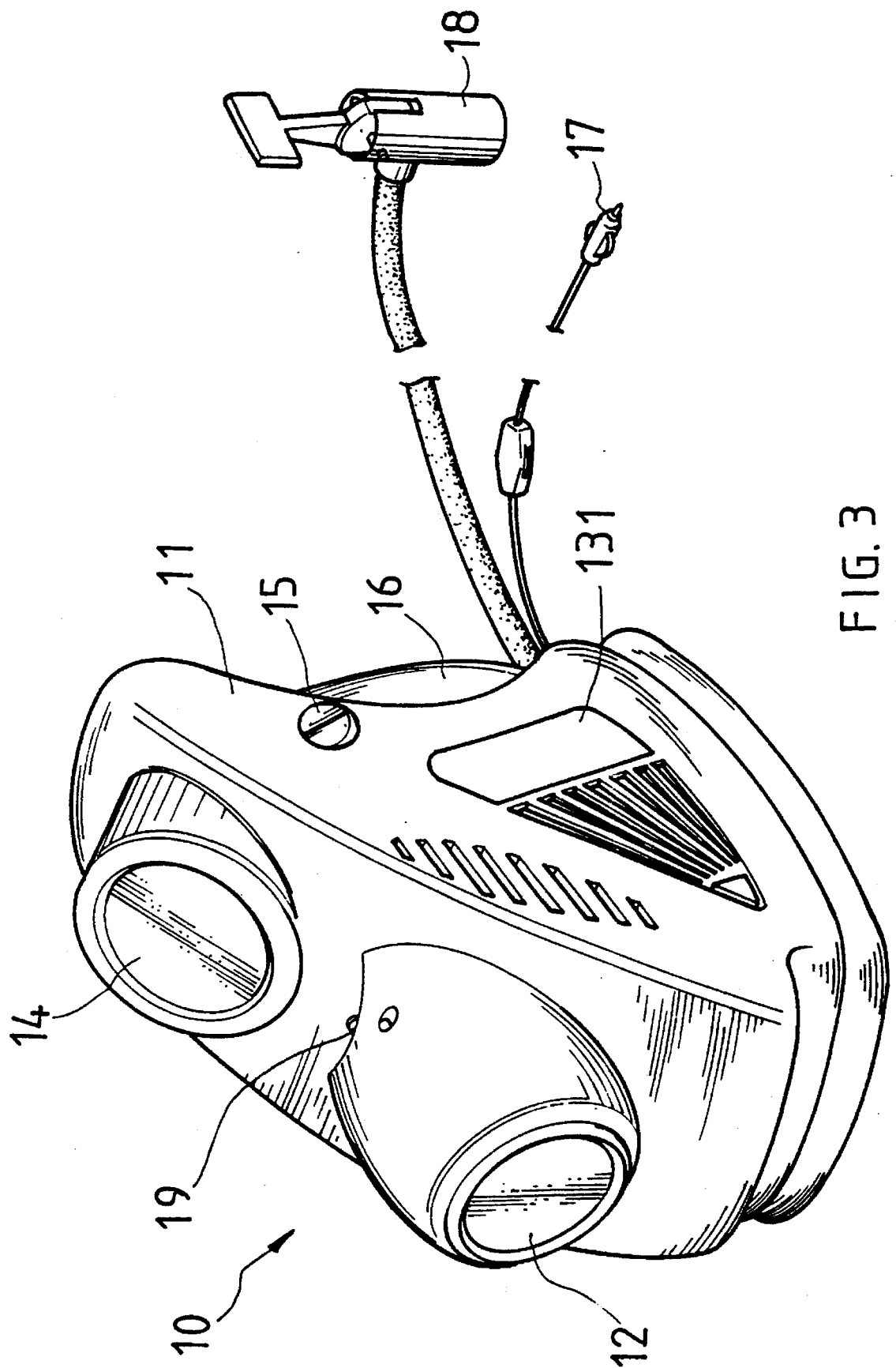
FIG. 3 is a perspective view illustrating a portable electric pump and illuminating/alarm device in accordance with the present invention.
Figure 4:
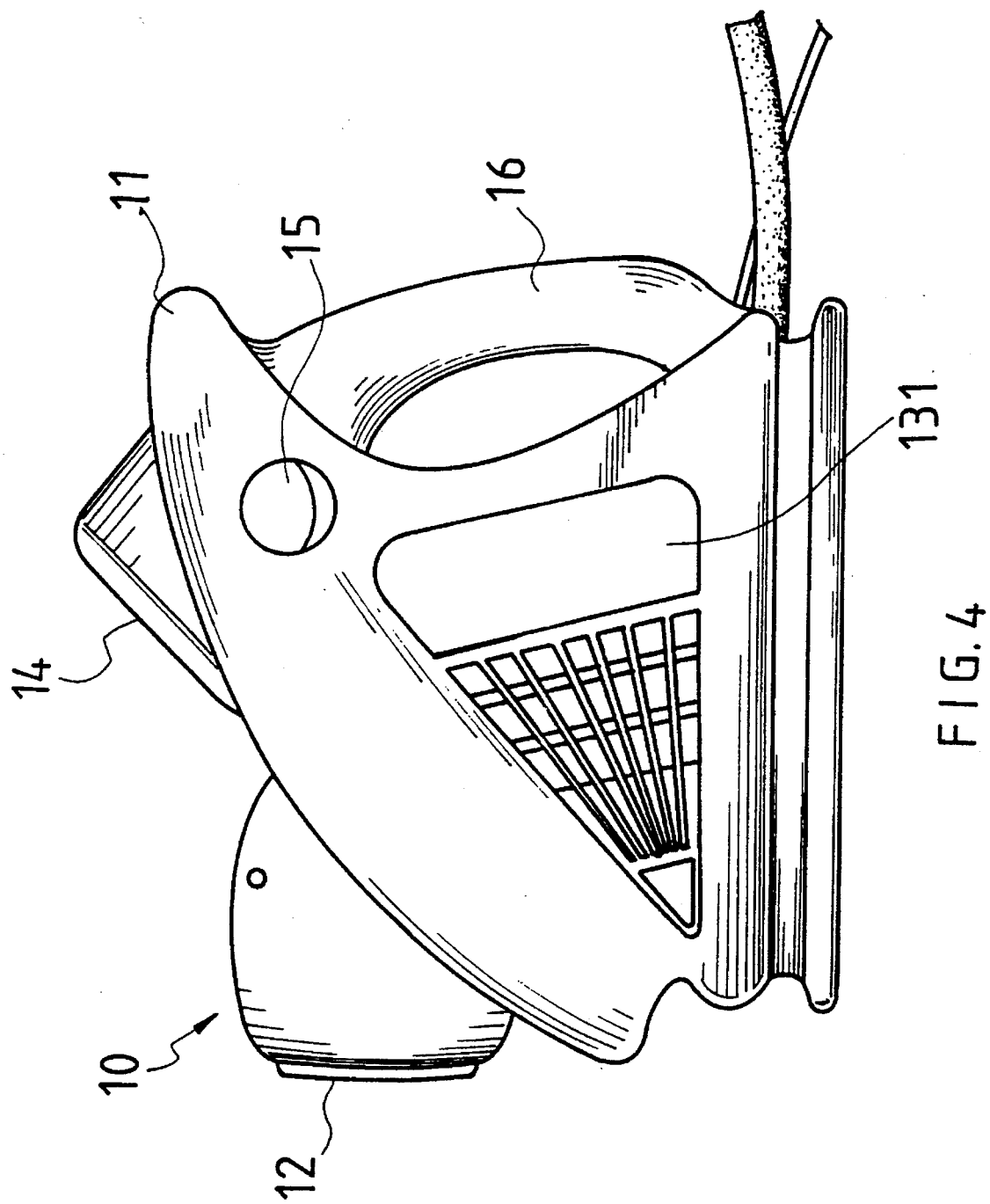
FIG. 4 is a schematic side elevational view of the portable electric pump and illuminating/alarm device in accordance with the present invention.
Figure 5:
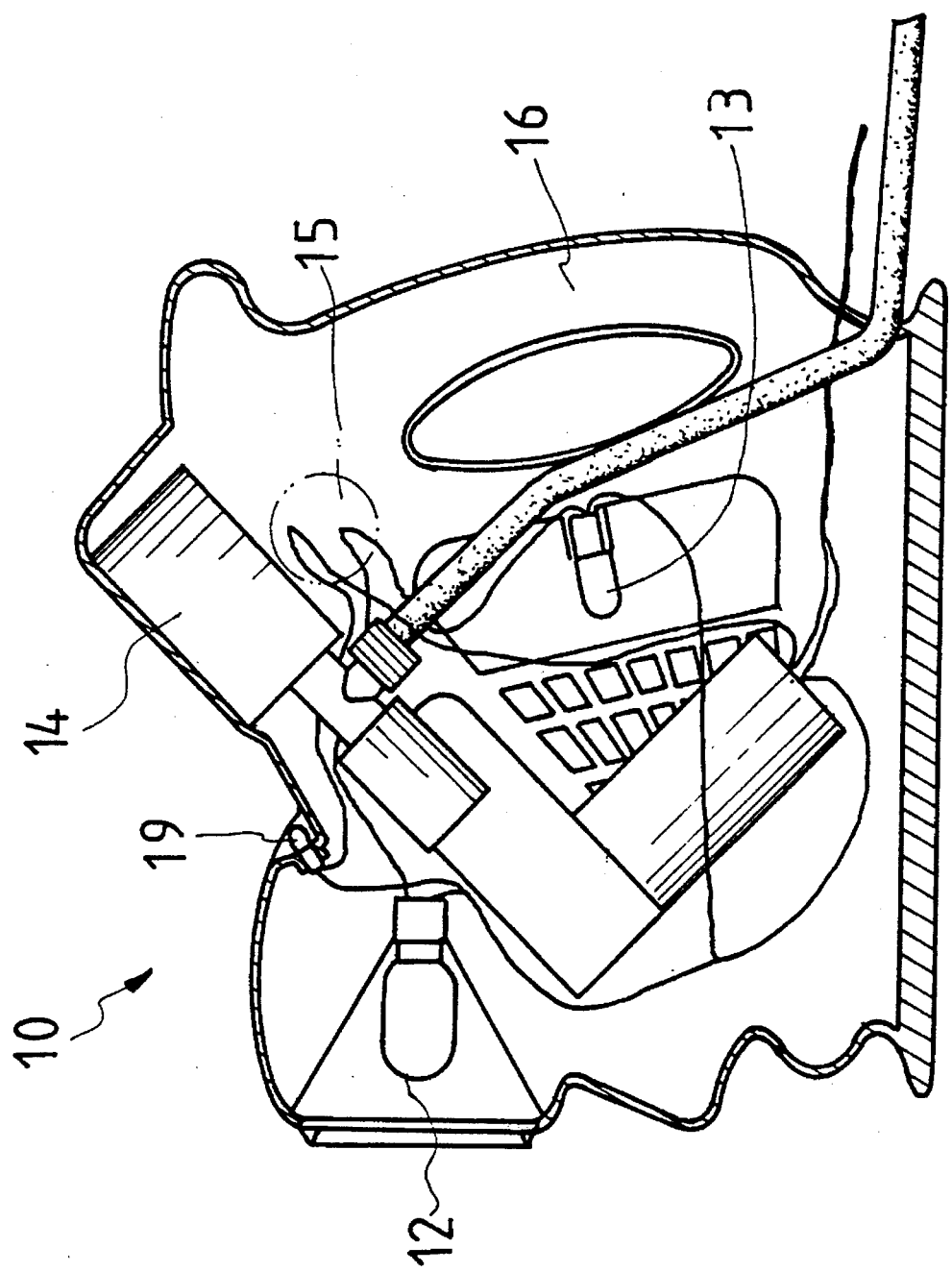
FIG. 5 is a cross-sectional view of the portable electric pump and illuminating/alarm device in accordance with the present invention.
Figure 6:
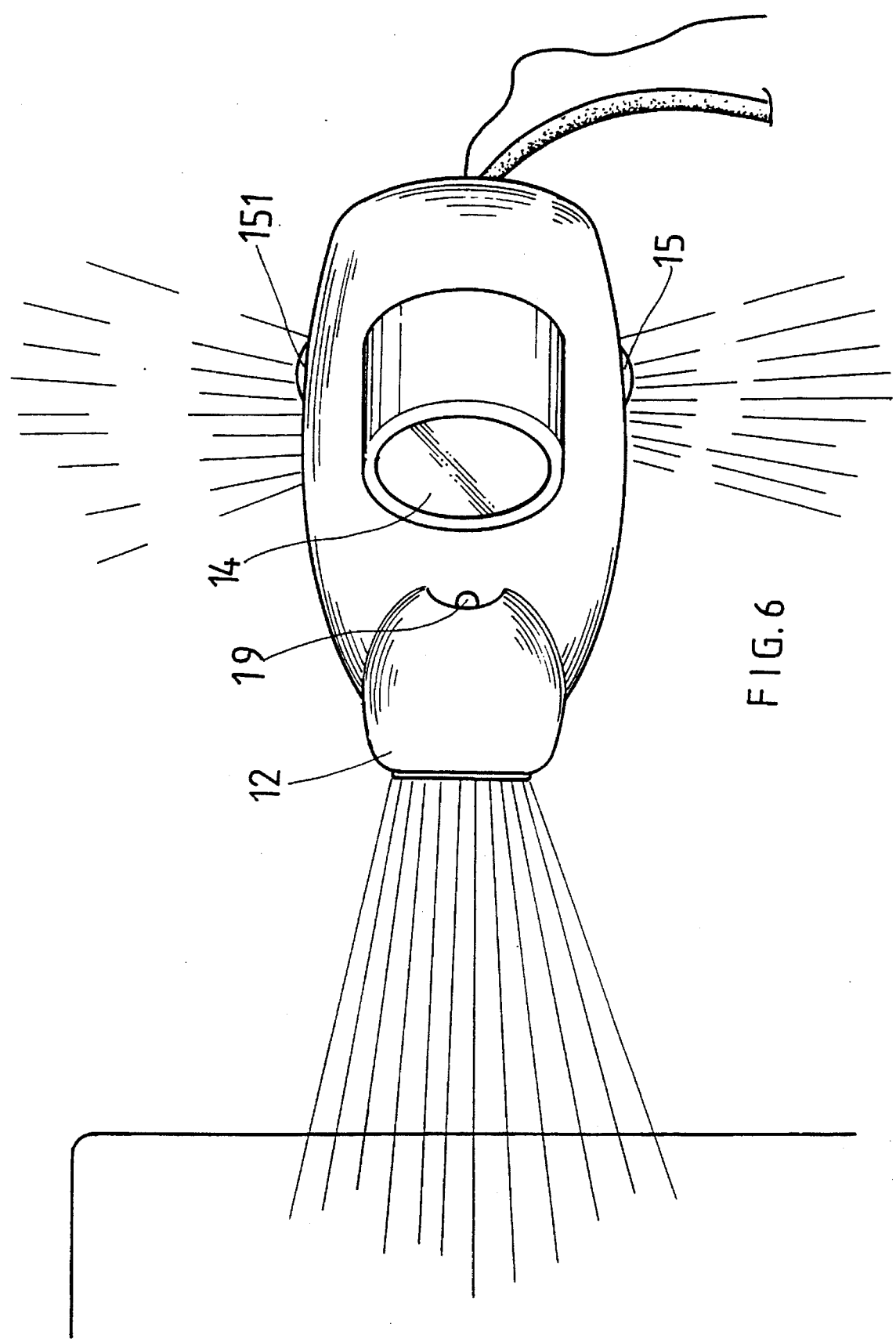
FIG. 6 is a top plan view of the portable electric pump and illuminating/alarm device in accordance with the present invention.
Figure 7:
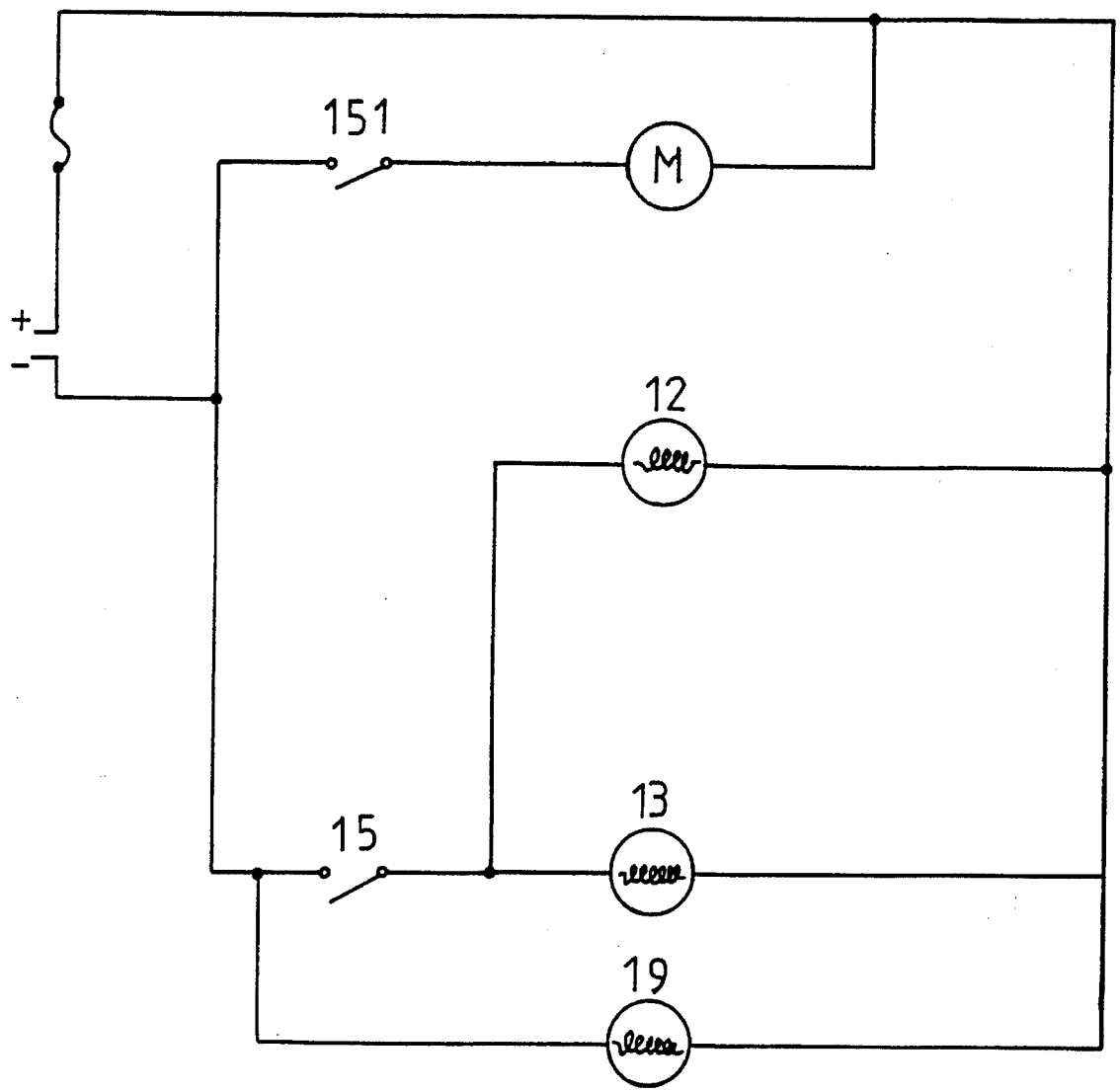
FIG. 7 is a schematic diagram of a circuitry of the portable electric pump and illuminating/alarm device in accordance with the present invention.

Referring now to FIGS. 3 through 7 and initially to FIGS. 3 through 5, a portable electric pump and illuminating/alarm device 10 in accordance with the present invention generally includes a main body housing 11, an illumination lamp 12, two alarm lamps 13 (see FIG. 5), a pressure gauge 14, an indication lamp 19, and switches 15 and 151 (see FIG. 6).

The main body housing 11 is an integrally formed housing with a protuberance (not labeled) formed on a rear section of a top surface thereof to which the pressure gauge 14 is mounted. As seen in FIG. 3, the top surface inclines forwardly and includes a second protuberance (not labeled) formed on a front section thereof to which the illumination lamp 12 is mounted for illuminating a front direction of the device.

The two alarm lamps 13 are respectively mounted to two lateral sides of the main body housing to illuminate in a lateral direction of the device and each of which is covered by a lamp housing 131 which is usually red for alarm purpose. The device further includes venting holes (not labeled) defined in the lateral sides of the main body housing 11 to prevent overheating inside the main body housing, a handle 16 provided to a rear side of the main body housing 11, a plug 17 for electrical connection to an external power source, such as a socket (cigarette lighter socket) in an automobile which, in turn, is electrically connected to a battery unit of the automobile, and an air outlet nozzle 18, which are conventional and are therefore not further described. Switch 15 controls ON and OFF of the alarm lamps 13 and the illumination lamp 12 while switch 151 controls operation of the electric pump which is also conventional (see FIG. 7). The indicator lamp 19 provides illumination to the reading of the pressure gauge 14 which is convenient when pumping a flat tire in the night or poor visibility.

When in use, referring to FIG. 6, the user may turn on the switch 15 to light both of the illumination lamp 12 and the alarm lamps 13. Thus, the device provides two functions (illumination and alarm) simultaneously without switching between the two functions. Furthermore, the alarm lamps are located on the two lateral sides of the main body housing, which reliably provides an alarm effect in actual use. Additionally, the present device, as shown in FIG. 3, is a light, compact design, while the conventional device requires an additional color lamp housing for alarm purpose.

Although the invention has been explained in relation to its preferred embodiment, it is to be understood that many other possible modifications and variations can be made without departing from the spirit and scope of the invention as hereinafter claimed.

What is claimed is:

1. A portable lamp and electric pump system comprising:

(a) a housing member having a pair of laterally opposed side portions and a front portion extending therebetween;

(b) electric air pump means secured to said housing member for generating pressurized air, said electric air pump means having coupled thereto air outlet means for expulsion of said pressurized air;

(c) a pressure gauge secured to said front portion of said housing for indicating the pressure of said pressurized air generated by said electric air pump means;

(d) an illumination lamp secured to said front portion of said housing member;

(e) at least a pair of alarm lamps secured respectively to said side portions of said housing member for generating an illuminated distress signal, said alarm lamps being coupled to said illumination lamp and said electric air pump means for selectively actuated simultaneous operation therewith;

(f) switch means coupled to said electric air pump means and said illumination and alarm lamps for selective actuation thereof; and, (g) a power plug coupled to said electric air pump means and said illumination and alarm lamps, said power plug being adapted for coupling with an external power source;

(h) wherein said front portion of said housing member is characterized by a sloped contour to extend in both a vertical direction and a longitudinal direction, said illumination lamp being disposed in vertically and longitudinally displaced relation to said pressure gauge.

* * * * *